Aug. 9, 1932.    G. CATTANEO    1,870,323
MANUFACTURE OF INSULATING MATERIAL
Filed Oct. 12, 1929
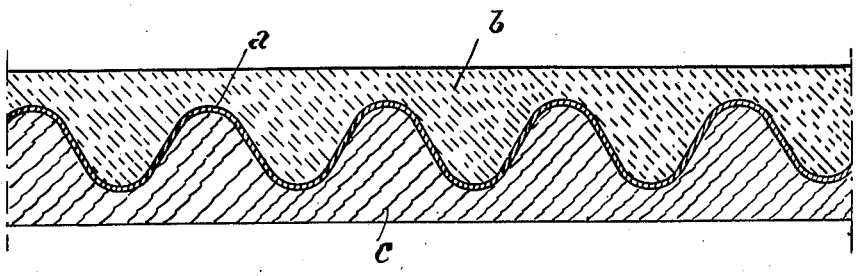

Patented Aug. 9, 1932

1,870,323

UNITED STATES PATENT OFFICE

GIUSTINO CATTANEO, OF MILAN, ITALY

MANUFACTURE OF INSULATING MATERIAL

Application filed October 12, 1929, Serial No. 399,374, and in Italy October 19, 1928.

In motor vehicles, especially in those driven by internal combustion engines, the chassis or frame comprises all the mechanical parts requisite to obtain and transmit movement, whereas the coachwork is intended to accommodate the passengers. The coachwork generally is a separate structure, resting upon and fixed to the frame. In order, however, to permit the inspection of and accessibility to some parts of the frame, it is necessary for the coachwork floor to be readily removable. This entails some objections, such as the transmission of noises, the leakage of hot gases of bad odor through the floor joints, which are especially injurious to the health in the case of a closed coachwork, the deformation of the plates, and so on.

The improvement forming the subject matter of the invention aims to eliminate such objections.

According to the invention, the plates used in building the coachwork floor, foot-rests and instrument board consist of a core portion made of flat or (in order to secure the necessary strength) corrugated or ribbed metal sheet. To one face of this sheet, namely to the face which in erected conditions will be the upper face, an india rubber layer of a certain thickness is fixed by means of cement or by vulcanizing, the rubber layer being smooth, or roughed or fitted with small projections intended to increase the adherence. To the underside of said core sheet, a layer of insulating, non-inflammable material such as woven asbestos or asbestos mass is applied. The plates thus manufactured will therefore exhibit the properties of damping noises and not letting the heat pass, while the joints between the plates, owing to the presence of the two coatings which possess a certain elasticity, will be impermeable and prevent the passage of the gases and dust.

In the accompanying drawing, —a— is the plate core consisting in a metal sheet, —b— is the rubber coating, and —c— is the coating made of insulating material.

Of course, as already mentioned, for the metal sheet any section may be provided which is deemed most suitable in view of the desired maximum strength and of the loads which the plate will be called upon to carry.

Having now particularly described and ascertained the nature of my said invention and in what manner the same is to be performed, I declare that what I claim is:—

1. A composite plate comprising a corrugated metallic sheet, a rubber sheet having a roughened surface affixed at that surface to one surface of said metallic sheet, and a layer of thermally insulating material affixed to the other surface of said metallic sheet.

2. A composite plate comprising a corrugated metallic sheet, a rubber sheet having a corrugated surface affixed at that surface to one surface of said metallic sheet, and a layer of thermally insulating material affixed to the other surface of said metallic sheet.

Signed at Milan (Italy), this 30 day of Sept., 1929.

GIUSTINO CATTANEO.